April 4, 1944.   W. H. ALLEN   2,345,564
BEARING ARRANGEMENT
Filed June 12, 1941
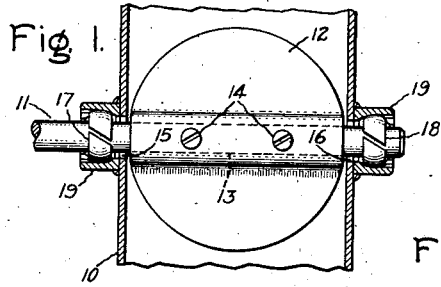
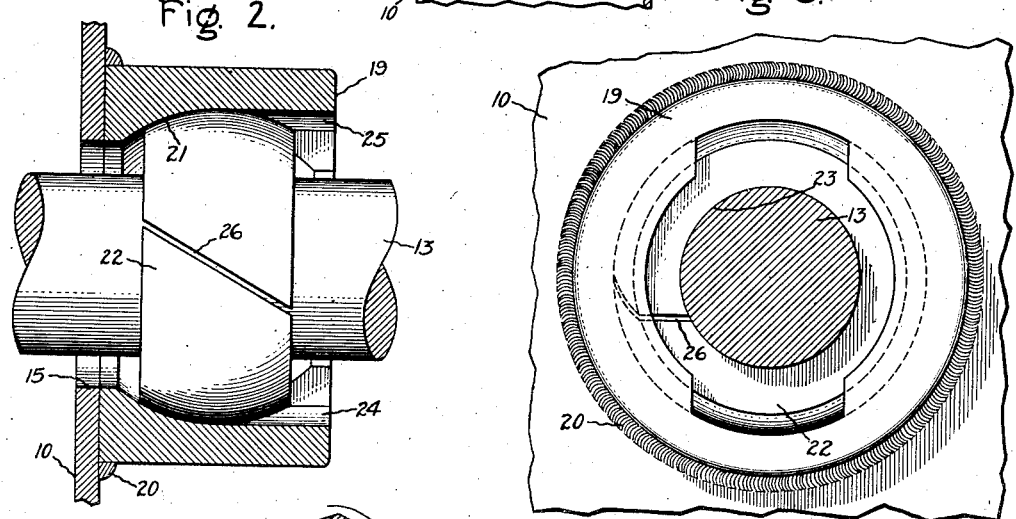
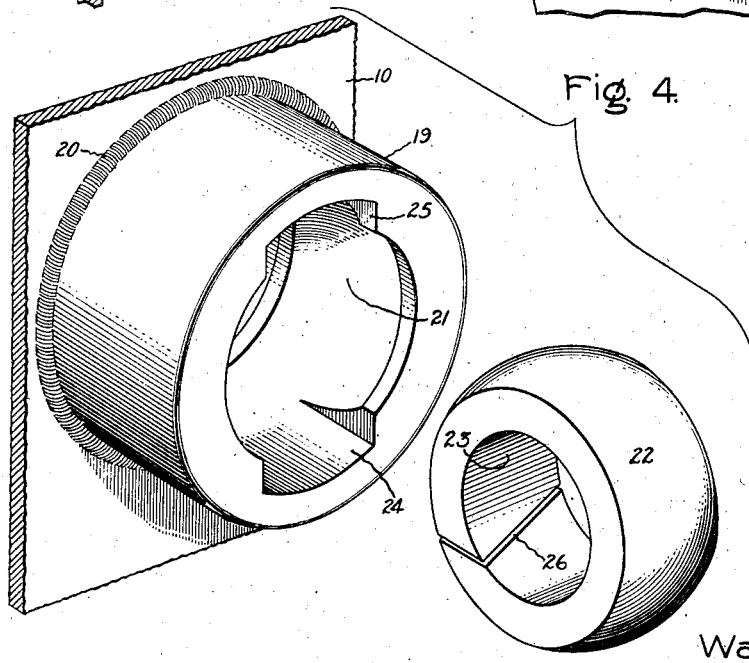
Inventor:
Wayne H. Allen,
by Harry E. Dunham
His Attorney.

Patented Apr. 4, 1944

2,345,564

UNITED STATES PATENT OFFICE 2,345,564

BEARING ARRANGEMENT

Wayne H. Allen, Los Angeles, Calif., assignor to General Electric Company, a corporation of New York Application June 12, 1941, Serial No. 397,769

2 Claims. (Cl. 308—72)

The present invention relates to bearing arrangements, more particularly to self-aligning bearings as are used, for example, in turbosuperchargers for supporting waste gates thereof. These waste gates serve to control the flow of hot gases from a nozzle box or the like to the atmosphere. When used on aircraft all these parts have to be made of light weight and due to the light structure and the considerable temperature changes to which they are subjected, considerable distortions of the waste conduit and the waste gate therein may take place. It becomes accordingly important to properly support the waste gate on the waste conduits to assure safe operation at all times and to prevent sticking of the gate in the waste conduit.

The general object of my invention is to provide an improved construction of bearing arrangements especially adapted for supporting waste gates although not necessarily limited thereto.

For a consideration of what I believe to be novel and my invention, attention is directed to the following description and the claims appended thereto in connection with the accompanying drawing.

In the drawing Fig. 1 illustrates a waste gate arrangement for turbosuperchargers embodying my invention; Fig. 2 is an enlarged sectional view of a bearing used in Fig. 1; Fig. 3 is a front view of Fig. 2; and Fig. 4 is an exploded perspective view of the bearing illustrated in Figs. 2 and 3.

The arrangement as shown in Fig. 1 comprises a conduit 10 for conducting fluid, for example for discharging or bypassing a part of the combustion or exhaust gases to be conducted to a gas turbine. The flow of the gases in the conduit 10 is controlled in known manner by the provision of a butterfly valve 11, having a disc 12 disposed within the conduit 10 and supported thereon by means including a shaft or trunnions 13 fastened to the disc 12 by screws 14. The ends of the shaft 13 project through diametrically opposite openings 15, 16 of the conduit 10 and have portions held on bearing arrangements 17, 18 adjacent the openings 15 and 16 respectively. The left hand portion of the shaft 13 has an extension for connection to an actuating member, not shown, for the valve.

During operation as pointed out above, the conduit and the valve are subject to distortions due to considerable temperature changes. Thus, it may occur that one side of the conduit expands more than the other. In order to prevent sticking of the valve, more particularly of the shaft or trunnions in the bearings, I provide in accordance with my invention, self-aligning bearing arrangements. Each bearing, as shown in Figs. 2 to 4, comprises a substantially cylindrically shaped boss, pedestal or bearing housing 19 secured to, in the present instance integrally united with conduit 10 by a weld 20. The housing 19 has an inner substantially spherically shaped wall 21 forming a support for a bearing proper 22. The bearing proper 22 has a cylindrical bore 23 forming a bearing surface for the shaft or trunnion member 13. The outer surface of the bearing proper or bearing member 22 is also spherically shaped with and has a diameter slightly more than the diameter of the spherically shaped wall 21 of the housing 19.

Both the bearing housing 19 and the bearing member 22 are made from single pieces; each of these elements constitutes a single integral member. This is an important feature of my invention because it eliminates the provision of flanges as have been provided heretofore to connect or flange together upper and lower halves of the bearing member and the bearing housing.

With both the housing and the bearing proper constituting single integral elements having adjacent spherically shaped surfaces engaging each other, assembling and dismantling of these elements may be accomplished by the provision of two slots 24 and 25 formed in diametrically opposite portions of the housing 19. As shown in Fig. 4, the slots 24, 25 are formed in the outer end portions of the housing 19. Their outer wall is cylindrical and has a diameter equal to the diameter of the spherical wall of the housing 19.

During assembly the bearing member 22 is placed into a position co-axial to that of the housing 19 as indicated in the perspective view of Fig. 4. In this position the bearing member 22 is inserted through the slots 24, 25 into the housing 19 and as it is in a central position thereon, the bearing member 22 is turned by 90° so that the axis of its bore coincides with the center line of the openings 15 and 16 in the conduit 10.

During dismantling of the arrangement, the shaft 13 is disconnected from the disc 12 by removal of the screws 14, thereupon the shaft may be removed axially from the bearings. Removal of the bearing member 22 from the housing 19 is accomplished by turning the bearing member 22 by 90 angular degrees and subsequently sliding it out of the housing through the slots 24, 25.

During operation the bearing members 22 align themselves automatically so as to cause minimum friction between the shaft and the bearing members 22. Such alignment takes place both during assembly as well as during operation upon distortion of the conduit.

When used at normal temperatures, the bearing may be lubricated in well known manner. At high temperatures, of the order of 700° F. and above, the bearing may be lubricated by the provision of grooves in the bearing surface of the bearing member 22 filled with graphite or a like heat resistant lubricant. An arrangement of this kind is more fully disclosed in the co-pending application, Serial No. 314,495, filed January 18, 1940, and assigned to the same assignee as the present application.

In order to reduce the possibility of binding between the shaft and the bearing member 22 due to relative expansion between them, the bearing member 22 may be provided with a slot 26 extending through its entire width and depth, though in many installations the formation of such slot does not appear essential. Even if binding or seizing between the shaft and the bearing member 22 should occur, the arrangement may still continue to function because in such cases the outer spherical surface of the bearing member 22 remains rotatably supported on the inner spherical wall of the housing 19. In certain instances it may be desirable to reduce the friction between the bearing member 22 and the housing 19. This may be readily accomplished by the provision of a plurality of concentric grooves in one of the cooperating spherical surfaces of the housing 19 and the bearing member 22.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. Bearing arrangement comprising a bearing member consisting of a single piece having a cylindrical bearing surface for supporting a shaft and an outer spherical surface, a housing consisting of a single piece forming a spherical wall for engaging said spherical surface, diametrically opposite portions in one half only of the spherical wall being cut away and forming diametrically opposite passages with cylindrical surfaces of a diameter equal to that of the spherical wall to permit the bearing member to be inserted into and removed from the housing.

2. Bearing arrangement comprising a bearing member consisting of a single piece forming a cylindrical bearing surface and an outer spherical surface, a housing having a spherical wall engaging the spherical surface, the bearing member being split on one side only to form a slot between the adjacent faces of the split portion, said slot extending through its entire width and depth.

WAYNE H. ALLEN.